United States Patent
Joyce

(10) Patent No.: US 9,763,388 B2
(45) Date of Patent: Sep. 19, 2017

(54) AGRICULTURAL HARVESTER HAVING A HEADER BASED HEAT EXCHANGER

(71) Applicant: CNH Industrial America LLC, New Holland, PA (US)

(72) Inventor: Joshua Steward Joyce, Lititz, PA (US)

(73) Assignee: CNH Industrial America LLC, New Holland, PA (US)

(*) Notice: Subject to any disclaimer, the term of this patent is extended or adjusted under 35 U.S.C. 154(b) by 65 days.

(21) Appl. No.: 14/854,557

(22) Filed: Sep. 15, 2015

(65) Prior Publication Data

US 2017/0071131 A1 Mar. 16, 2017

(51) Int. Cl.
| | |
|---|---|
| F28D 15/00 | (2006.01) |
| A01D 69/03 | (2006.01) |
| A01D 41/06 | (2006.01) |
| A01D 101/00 | (2006.01) |
| F28D 21/00 | (2006.01) |

(52) U.S. Cl.
CPC ............ *A01D 69/03* (2013.01); *A01D 41/06* (2013.01); *F28D 15/00* (2013.01); *A01D 2101/00* (2013.01); *F28D 2021/0019* (2013.01); *F28D 2021/0089* (2013.01)

(58) Field of Classification Search
CPC F01P 11/12; F01P 2060/02; F01P 3/18; F01P 2003/182; F01P 2003/185; F01P 7/044; F01P 2025/08; F01P 2025/40; F01P 2025/60; F01P 2070/52; F28D 1/00; F28D 1/0443; F28D 2021/0089; F28D 1/0435; F28D 9/005

USPC .............................................. 165/42, 104.11
See application file for complete search history.

(56) References Cited

U.S. PATENT DOCUMENTS

| | | | |
|---|---|---|---|
| 4,192,144 A | 3/1980 | Pierce | |
| 4,436,146 A | 3/1984 | Smolarek | |
| 4,531,368 A | 7/1985 | Killen | |
| 4,542,785 A * | 9/1985 | Bagnall | F01P 11/06 165/119 |
| 5,234,051 A * | 8/1993 | Weizenburger | B60K 11/04 123/41.31 |
| 5,595,537 A * | 1/1997 | Jungemann | F01P 11/12 460/100 |
| 6,116,006 A | 9/2000 | Killen et al. | |
| 6,775,966 B2 | 8/2004 | Frego | |
| 6,817,404 B2 * | 11/2004 | Frana-Guthrie | F01P 3/18 165/43 |
| 6,988,532 B2 * | 1/2006 | Hamada | F28F 9/001 165/144 |
| 7,669,643 B2 | 3/2010 | Ekelund et al. | |
| 7,908,836 B1 | 3/2011 | Rayfield et al. | |
| 8,038,518 B2 | 10/2011 | Marvin et al. | |
| 8,224,534 B2 | 7/2012 | Kowalchuk | |
| 8,286,410 B2 | 10/2012 | Priepke et al. | |
| 8,714,310 B2 | 5/2014 | Bares et al. | |

(Continued)

*Primary Examiner* — Árpád Fábián-Kovács
(74) *Attorney, Agent, or Firm* — Patrick M. Sheldrake

(57) ABSTRACT

An agricultural harvester having a combine and a header. The combine includes a primary hydraulic system for use in operations of the combine. The primary hydraulic system includes primary hydraulic fluid. The header is attachable to the combine and includes a header hydraulic system having a header hydraulic fluid and a heat exchanger operatively connected to the primary hydraulic system and the header hydraulic system.

10 Claims, 2 Drawing Sheets

(56) References Cited

U.S. PATENT DOCUMENTS

| | | | |
|---|---|---|---|
| 8,844,504 B2* | 9/2014 | Raduenz | F28D 7/1684 |
| | | | 123/568.12 |
| 8,857,141 B2 | 10/2014 | Honas et al. | |
| 8,985,192 B2 | 3/2015 | Mitsuhashi et al. | |
| 9,055,715 B2* | 6/2015 | Isfort | A01D 61/00 |
| 9,101,090 B2 | 8/2015 | Pierce et al. | |
| 9,435,591 B2* | 9/2016 | Hachmann | F28G 15/02 |
| 2001/0029907 A1* | 10/2001 | Algrain | F01P 3/18 |
| | | | 123/41.29 |
| 2004/0250988 A1* | 12/2004 | Machanek | F28D 1/0443 |
| | | | 165/76 |
| 2005/0183417 A1* | 8/2005 | Nakagawa | E02F 9/0866 |
| | | | 60/456 |
| 2008/0000208 A1* | 1/2008 | Edwards | A01G 3/002 |
| | | | 56/7 |
| 2008/0047687 A1* | 2/2008 | Leitch | F28D 1/0443 |
| | | | 165/70 |
| 2009/0211208 A1* | 8/2009 | Johnson | B01D 46/0065 |
| | | | 55/291 |
| 2012/0134848 A1* | 5/2012 | Nelson | E02F 9/226 |
| | | | 417/53 |
| 2012/0247709 A1* | 10/2012 | Soldan | F28F 27/00 |
| | | | 165/11.1 |
| 2013/0247527 A1* | 9/2013 | Brockmann | A01D 75/18 |
| | | | 56/11.3 |
| 2013/0284419 A1* | 10/2013 | Collins | A01D 41/12 |
| | | | 165/287 |
| 2016/0097605 A1* | 4/2016 | Finch | F28F 9/0075 |
| | | | 165/200 |
| 2016/0215664 A1* | 7/2016 | Boyer | F01M 5/005 |
| 2016/0273840 A1* | 9/2016 | El Hajal | F28F 1/36 |

* cited by examiner

AGRICULTURAL HARVESTER HAVING A HEADER BASED HEAT EXCHANGER

BACKGROUND

The present invention relates generally to an agricultural harvester. In particular, the present invention relates to an agricultural harvester having a header with a dedicated hydraulic circuit and heat exchanger.

Agricultural harvesters employ headers for processing fields of crop or crop related materials. Such headers can include for example, corn headers, windrowers, draper headers, platform headers and the like. Conventional agricultural harvesters can include a single hydraulic circuit for sharing hydraulic fluid between a combine and the header. Such a hydraulic circuit is complex and can have a tendency to run at a high hydraulic system temperature which can lead to component degradation, loss of performance, and operator safety concerns. Conventional agricultural harvesters can also include separate header hydraulic systems. However, such systems cannot actively control hydraulic fluid temperatures.

Accordingly, there is a need for an agricultural harvester that is capable of addressing the aforementioned problems of conventional agricultural harvester hydraulic circuits. Such a need is satisfied by the agricultural harvester of the subject application.

BRIEF SUMMARY

In accordance with a first aspect of the subject application, an agricultural harvester with improved efficiency in hydraulic system design is disclosed. The agricultural harvester includes a combine having a primary hydraulic system for use in operations of the combine. The primary hydraulic system includes a primary hydraulic fluid. The agricultural harvester further includes a header attachable to the combine that includes a header hydraulic system and a heat exchanger. The header hydraulic system includes a header hydraulic fluid. The heat exchanger is operatively connected to the primary hydraulic system and the header hydraulic system. The combine further includes a pump and a cooler, and the header includes a motor. The primary hydraulic system is operatively connected to the pump, the cooler and the motor. Furthermore, the heat exchanger is operatively connected to the primary hydraulic system downstream the motor.

In accordance with another aspect, the subject application provides for a heat exchanger incorporated onto a combine header that uses the combine's hydraulic system to cool the header hydraulic system. That is, heat is exchanged between the header hydraulics and the combine hydraulics without exchanging hydraulic fluid e.g., oil, between the two hydraulic systems. For example, runoff of a reel drive can be used to cool the header hydraulic system.

For example, hot return oil from the header hydraulic system is routed through an oil-to-oil heat exchanger. Return flow from the reel drive is routed through the other side of the heat exchanger. This reel drive return flow is at a lower temperature than the former as it is exposed to the combine base unit cooler and also air. This, in turn, reduces the temperature of the header hydraulic system oil and uses the combine hydraulic system to reject the heat.

The foregoing system advantageously reduces the overall complexity of a hydraulic circuit compared to a header/combine hydraulic system that directly shares oil, for example, by eliminating or reducing moving parts.

BRIEF DESCRIPTION OF THE SEVERAL VIEWS OF THE DRAWINGS

The foregoing summary, as well as the following detailed description of the preferred aspects of the subject application, will be better understood when read in conjunction with the appended drawings. For the purpose of illustrating the invention, there are shown in the drawings aspects which are presently preferred. It should be understood, however, that the invention is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Figure 1:
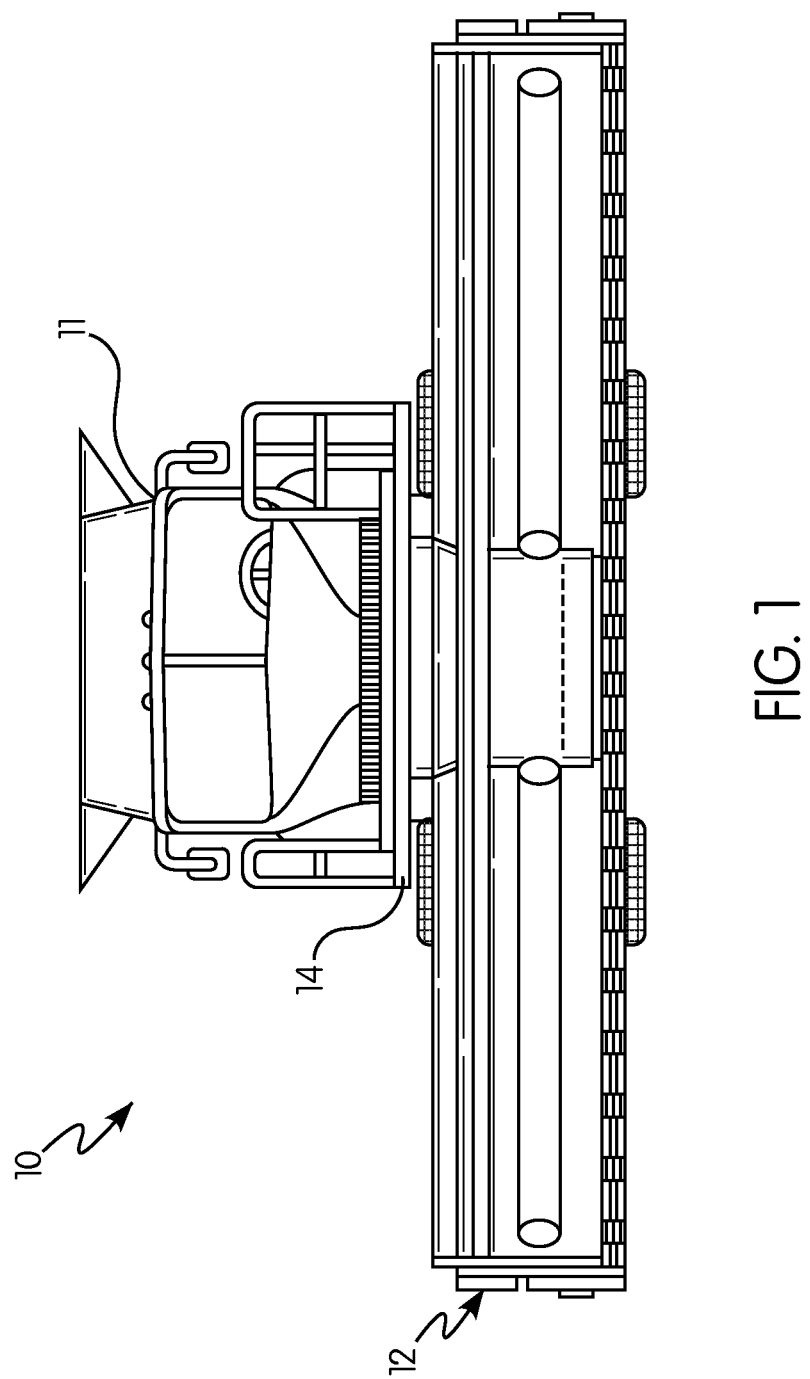
FIG. 1 is a front elevation view of an agricultural harvester including a combine and header applicable to the subject application.

Referring now to the drawings, wherein aspects of the subject application are shown, FIG. 1 illustrates an agricultural harvester 10 that includes a combine 11 and a header 12. The header 12 is attached to a forward end 14 of the harvester and is configured to cut and/or process crops or other crop material for further processing downstream within the combine 11.

Headers applicable to the subject application, include e.g., a corn header, a windrower, a draper header, and a platform header. Such headers are known in the art and therefore a detailed discussion of their structure, function and operation is not necessary for a complete understanding of the subject application. However, exemplary headers applicable to the subject application are disclosed in U.S. Pat. Nos. 7,908,836; 8,224,534; 8,286,410; 8,857,141; and 9,101,090, the entire disclosures of which are hereby incorporated by reference in their entirety for all purposes.

Figure 2:
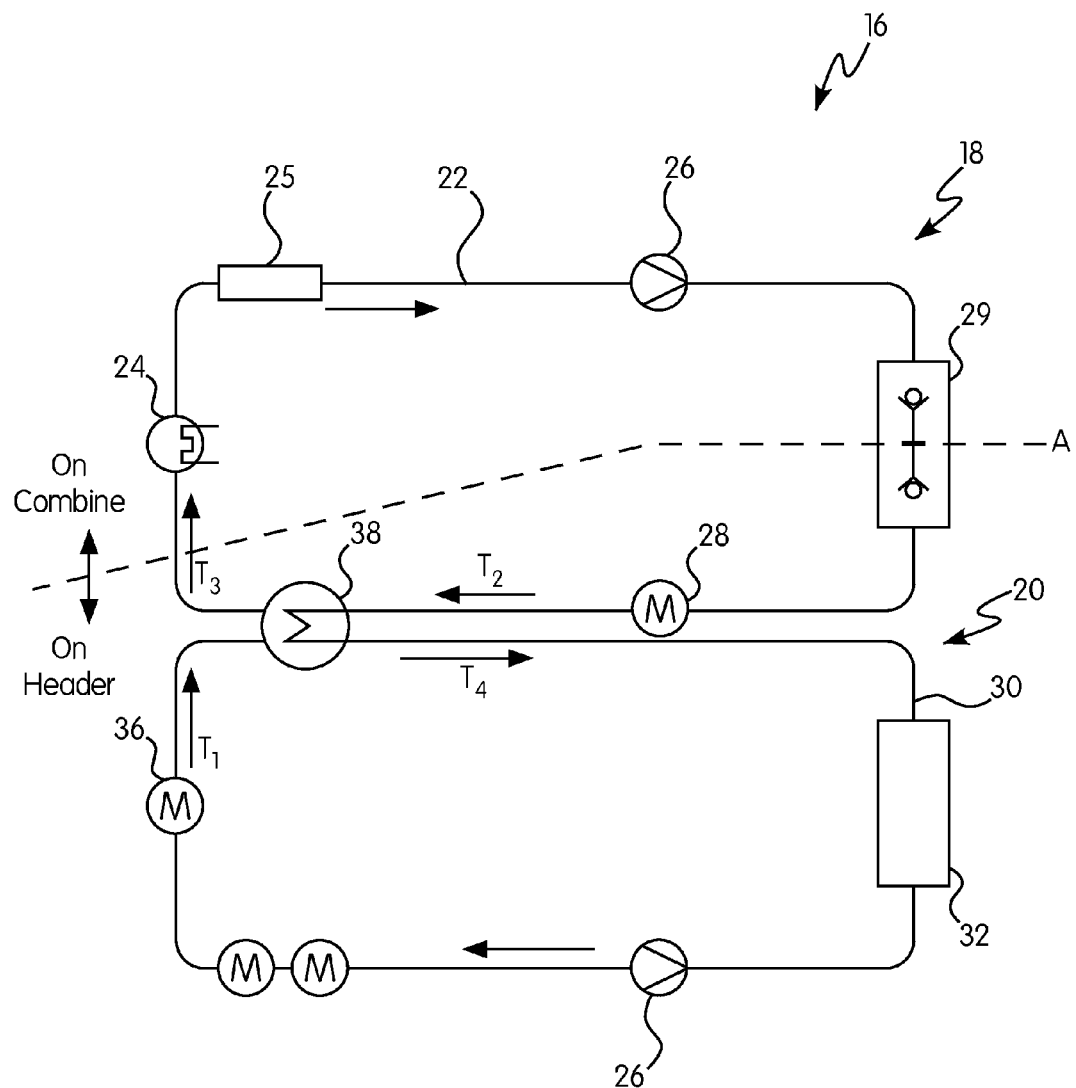
FIG. 2 is a schematic view of a hydraulic circuit of a combine and a header in accordance with a preferred aspect of subject application.

Referring to FIG. 2, there is schematically depicted a hydraulic system 16 of the agricultural harvester 10 that includes a primary hydraulic system 18 of the combine 11, which is operatively connected to a header hydraulic system 20 of the header 12. The primary hydraulic system 18 includes a primary hydraulic circuit 22 having a primary hydraulic fluid for operation of various components of the combine. As shown in FIG. 2, the primary hydraulic system is operatively connected to a cooler 24, a reservoir 25, a pump 26 downstream to cooler, and a reel drive motor 28 downstream the pump. The foregoing are exemplary components of the combine 11 operatively connected to the primary hydraulic system 18 and other components or multiples of similar components can be operatively connected to the primary hydraulic system. These exemplary components can also be arranged in differing order.

As shown in FIG. 2, everything above line A is mounted on the combine while everything below line A is mounted on the header. Specifically, the reel drive motor 28 is mounted on the header but operatively connected to the primary hydraulic system via a quick connect coupler 29. That is, the quick connect coupler connects the reel drive motor 28 to the primary header hydraulic system 18.

The header hydraulic system 20 is situated on the header 12 which is to be connected to the combine 11. The header hydraulic system 20 includes a header hydraulic circuit 30 that is operatively connected to a reservoir 32, a pump 34 downstream the reservoir, and one or more motors 36 downstream the pump. The reservoir 32 is a dedicated reservoir on the header that advantageously allows for additional rejection of heat during operations. The foregoing are exemplary components of the header 12 operatively connected to the header hydraulic system 20 and other components or multiples of similar components can be operatively connected to the header hydraulic system. These exemplary components can also be arranged in differing order.

The header 12 also includes a heat exchanger 38 mounted directly on the header, e.g., on a chassis or frame of the header. The heat exchanger 38 is operatively connected to and in fluid communication with the primary hydraulic circuit 22 and the header hydraulic circuit 30. Preferably, the heat exchanger 38 is operatively connected to and in fluid communication with the primary hydraulic circuit 22 downstream the reel drive motor 28 and upstream the cooler 24. In addition, the heat exchanger 38 is operatively connected to and in fluid communication with the header hydraulic circuit 30 downstream the motor 36 and upstream the reservoir 32. As known in the art, while the heat exchanger is in fluid communication with both the primary hydraulic fluid and the header hydraulic fluid, the heat exchanger does not combine or mix the two hydraulic fluid streams.

While FIG. 2 illustrates a single heat exchanger 38, the header can alternatively include more than one heat exchanger in series or in parallel for exchanging heat between the primary hydraulic system and the header hydraulic system.

The heat exchanger 38 can be a shell and tube heat exchanger, plate heat exchanger, plate and shell heat exchanger, a plate fin heat exchanger, or direct contact heat exchanger. Such heat exchangers are known in the art and therefore a detailed description of their structure or function and operation is not necessary for complete understanding of the subject application. However, heat exchangers applicable to the subject application are disclosed in U.S. Pat. Nos. 4,436,146; 7,669,643; 8,985,192; and 4,192,144, the entire disclosures of which are hereby incorporated by reference in their entirety for all purposes. Preferably, the heat exchanger is an AKG 400, 410, 415, 422 heat exchanger manufactured by AKG Thermal Systems, Inc. of Mebane, N.C.

The primary hydraulic fluid and header hydraulic fluid is preferably oil.

In operation, the header hydraulic fluid operates at a temperature T1 that is higher than an operating temperature T2 of the primary hydraulic fluid. That is, owing to the operation of the cooler 24, the temperature of the primary hydraulic fluid is cooled to a lower temperature than it would otherwise be and lower than the operating temperature of the header hydraulic fluid. The primary hydraulic fluid is also cooled due to its travel along a length of the primary hydraulic circuit from the reel drive motor 28 to the heat exchanger 38. In other words, primary hydraulic fluid travels along a substantial length of the primary hydraulic circuit thereby being air cooled. For example, the length of travel of primary hydraulic fluid from the reel drive motor 28 to the heat exchanger 38 can range from about 30 to 60 feet, which as a result can lead to substantial air cooling of the hydraulic fluid thereby reducing its overall temperature.

Upon passing through the heat exchanger 38, the operating temperature of the primary hydraulic fluid that exits the heat exchanger is at a temperature T3 that is higher than the temperature T2 that enters the heat exchanger. Moreover, the header hydraulic fluid exiting the heat exchanger 38 is at a temperature T4 that is lower than the temperature T1 of the header hydraulic fluid that enters the heat exchanger 38. In sum, the primary hydraulic fluid is at a first temperature, the header hydraulic fluid is at a second temperature greater than the first temperature, and the heat exchanger is configured to exchange heat between the primary and header hydraulic fluids.

In an exemplary operation of the hydraulic system 16, the temperature of the hydraulic fluid from reel drive motor entering the heat exchanger 38 can range from about 140-160° F., and the temperature of the hydraulic fluid from the reel drive motor exiting the heat exchanger can range from about 160-180° F. Whereas, the temperature of the hydraulic fluid from the header entering into the heat exchanger 38 can range from about 190-200° F., and the temperature from the hydraulic fluid exiting the heat exchanger can range from about 180-190° F.

By segmenting the hydraulic circuits of the combine and header, the subject application advantageously provides an agricultural harvester hydraulic system having lower complexity and a completely separate header hydraulic circuit with active controls for controlling the hydraulic fluid temperature. That is, having separate hydraulic circuits advantageously allows for reduced complexity and potential for breakdown. For example, if a header hydraulic system experiences a breakdown, it will not negatively impact the primary hydraulic system of the combine and vice versa. Further, shared hydraulic systems require a certain arrangement of components that may not be standard on every combine, plus they do not include a separate reservoir (such as reservoir 32 on the header hydraulic system) that facilitates heat rejection.

Moreover, the present embodiments in accordance with the subject application advantageously exchanges heat in a more favorable fashion compared to conventional hydraulic systems in which hydraulic fluid is exchanged between the combine hydraulic system and the header hydraulic system. That is, in a direct exchange of hydraulic fluid between combine and header hydraulic systems, the temperature of the hydraulic fluid ultimately reaching the cooler will be substantially higher than compared to the hydraulic systems of the subject application. This is because a temperature exchange between a primary hydraulic circuit and a header hydraulic circuit via a heat exchanger is lower than a system employing a direct exchange of hydraulic fluid between the primary hydraulic circuit and the header hydraulic circuit. Consequently, this substantially higher temperature of the hydraulic fluid reaching the cooler in conventional direct exchange hydraulic systems results in a higher burden on the cooler. Additionally, the higher the temperature a hydraulic fluid gets, the thinner the hydraulic fluid becomes and as such, any pump pumping thinner hydraulic fluid is required to work harder. In other words, as the temperature of an oil increases, the less viscous the oil becomes and the harder it becomes for a pump to pump oil of lower viscosity, thereby leading to faster component degradation and breakdown.

It will be appreciated by those skilled in the art that changes could be made to the preferred embodiments described above without departing from the broad inventive concept thereof. It is to be understood, therefore, that this invention is not limited to the particular embodiment disclosed, but it is intended to cover modifications within the spirit and scope of the present invention as defined by the appended claims.

We claim:

1. An agricultural harvester comprising:
   a combine having a primary hydraulic system for use in operations of the combine, wherein the primary hydraulic system includes a primary hydraulic fluid; and
   a header attachable to the combine, the header including:
      a header hydraulic system having a header hydraulic fluid, and
      a heat exchanger operatively connected to the primary hydraulic system and the header hydraulic system.

2. The agricultural harvester of claim 1, wherein heat exchanger is in fluid communication with the primary hydraulic system and the header hydraulic system.

3. The agricultural harvester of claim 1, wherein the combine further comprises a pump and a cooler, the header further comprises a motor, and the primary hydraulic system is operatively connected to the pump, the cooler and the motor, and wherein the heat exchanger is operatively connected to the primary hydraulic system downstream the motor.

4. The agricultural harvester of claim 3, wherein the heat exchanger is operatively connected to the primary hydraulic system upstream the cooler.

5. The agricultural harvester of claim 1, wherein the heat exchanger is mounted to the header.

6. The agricultural harvester of claim 1, wherein the primary hydraulic fluid is at a first temperature and the header hydraulic fluid is at a second temperature greater than the first temperature, and the heat exchanger is configured to exchange heat between the primary and header hydraulic fluids.

7. The agricultural harvester of claim 1, wherein the primary hydraulic fluid and the header hydraulic fluid is oil.

8. The agricultural harvester of claim 1, wherein the heat exchanger is a shell and tube heat exchanger, a plate heat exchanger, a plate and shell heat exchanger, a plate fin heat exchanger, or a direct contact heat exchanger.

9. An agricultural harvester comprising:
   a combine having a primary hydraulic system for use in operations of the combine, wherein the primary hydraulic system includes a cooler and a primary hydraulic fluid; and
   a header attachable to the combine, the header including:
      a header hydraulic system having a pump and a header hydraulic fluid independent of the primary hydraulic fluid, and
      a heat exchanger operatively connected to the primary hydraulic system and the header hydraulic system upstream the cooler and downstream the pump.

10. The agricultural harvester of claim 9, wherein the heat exchanger is configured to increase a temperature of the primary hydraulic fluid and decrease a temperature of the header hydraulic fluid.

* * * * *